United States Patent [19]

Rasbold et al.

[11] Patent Number: 5,202,975
[45] Date of Patent: Apr. 13, 1993

[54] METHOD FOR OPTIMIZING INSTRUCTION SCHEDULING FOR A PROCESSOR HAVING MULTIPLE FUNCTIONAL RESOURCES

[75] Inventors: James C. Rasbold, Livermore; Don A. Van Dyke, Pleasanton, both of Calif.

[73] Assignee: Supercomputer Systems Limited Partnership, Eau Claire, Wis.

[21] Appl. No.: 896,895

[22] Filed: Jun. 10, 1992

Related U.S. Application Data

[63] Continuation of Ser. No. 571,500, Aug. 23, 1990, abandoned, which is a continuation-in-part of Ser. No. 537,466, Jun. 11, 1990, Pat. No. 5,179,702.

[51] Int. Cl.⁵ .......................... G06F 9/45; G06F 9/455
[52] U.S. Cl. ..................................... 395/500; 395/375; 395/700; 395/800
[58] Field of Search ................ 395/375, 500, 700, 800

[56] References Cited

U.S. PATENT DOCUMENTS

| | | | |
|---|---|---|---|
| 4,128,880 | 11/1976 | Cray | 395/800 |
| 4,179,737 | 12/1979 | Kim | 364/200 |
| 4,210,961 | 7/1980 | Whitlow et al. | 364/200 |
| 4,298,933 | 11/1981 | Shimokawa | 364/200 |
| 4,370,709 | 1/1983 | Fosdick | 395/500 |
| 4,399,507 | 8/1983 | Cosgrove et al. | 364/200 |
| 4,567,574 | 1/1986 | Saade | 364/900 |
| 4,782,444 | 11/1988 | Munshi et al. | 395/700 |
| 4,847,755 | 7/1989 | Morrison et al. | 395/650 |
| 4,956,767 | 9/1990 | Stephenson | 395/500 |
| 5,021,945 | 6/1991 | Morrison et al. | 395/375 |

OTHER PUBLICATIONS

James Rumbaugh, "A Data Flow Multiprocessor", Feb., 1977, IEEE Transaction, vol. C26 No. 2 pp. 138–147.

Wei–Chung, Hsu, "Register Allocation and code Scheduling for Load/Store Architecture", thesis, Univ. of Wisc.

Primary Examiner—David Y. Eng
Attorney, Agent, or Firm—Patterson & Keough

[57] ABSTRACT

A method for scheduling instructions for a processor having multiple functional resources wherein the reordering of the instructions is accomplished in response to a simulation of the run-time environment of the target machine. The simulation of the run-time environment of the target machine is performed at compile time after the machine instructions have been generated by a compiler, or after instruction generation by an assembler. The present invention rearranges the machine instructions for a basic block of instructions into an order that will result in the fastest execution based upon the results of the simulation of the interaction of the multiple functional resources in the target machine.

3 Claims, 5 Drawing Sheets c = a * b
d = b + (e − f)
h = c * d

20↗

| | | | |
|---|---|---|---|
| 21a → | 1. | LOAD | R1,a |
| 21b → | 2. | LOAD | R2,b |
| 21c → | 3. | MULT | R3,R1,R2 |
| 21d → | 4. | LOAD | R4,e |
| 21e → | 5. | LOAD | R5,f |
| 21f → | 6. | SUB | R6,R4,R5 |
| 21g → | 7. | ADD | R7,R2,R6 |
| 21h → | 8. | MULT | R8,R3,R7 |
| 21i → | 9. | STORE | R8,h |

21↗

METHOD FOR OPTIMIZING INSTRUCTION SCHEDULING FOR A PROCESSOR HAVING MULTIPLE FUNCTIONAL RESOURCES

RELATED APPLICATIONS

This is a continuation of application 07/571,500, filed Aug. 23, 1990, now abandoned, which is a continuation-in-part of an application filed in the U.S. Patent and Trademark Office on Jun. 11, 1990, entitled INTEGRATED SOFTWARE ARCHITECTURE FOR A HIGHLY PARALLEL MULTIPROCESSOR SYSTEM, Ser. No. 07/537,466, now U.S. Pat. No. 5,179,700 which is assigned to the assignee of the present application, and which is hereby incorporated by reference in the present application. This application is related to a co-pending application filed in the U.S. Patent and Trademark Office on Jun. 11, 1990, entitled SCALAR/VECTOR PROCESSOR, Ser. No. 07/536,049, now U.S. Pat. No. 5,021,546 which is assigned to the assignee of the present application, and which is hereby incorporated by reference in the present application.

TECHNICAL FIELD

The present invention pertains generally to the field of software compiler technology, and to the scheduling of machine instructions to multiple functional resources in a processor. In particular, the present invention pertains to a method of rearranging the order in which machine instructions within a basic block of instructions are issued to a processor containing multiple functional resources so as to reduce the overall execution time of the basic block of instructions.

BACKGROUND ART

In an effort to improve the performance of computer processing systems, present computer processors utilize multiple functional resources for simultaneously performing multiple operations within a single processor. For purposes of the present invention, a functional resource may include any hardware resource directly available to a processor, such as registers, control elements, and, especially, arithmetic and logical functional units. For example, in U.S. Pat. No. 4,128,880, the vector processor is provided with three vector functional units and four scalar functional units. The existence of multiple functional units allows this processor to, for example, simultaneously perform two addition operations (one scalar, one vector), thereby increasing the overall performance of the processor. Multiple functional resources are most commonly associated with array or vector processors and scalar/vector processors, but may also be employed in traditional scalar processors.

Another mechanism to improve processor performance that is often associated with high performance processors having multiple functional units is pipelining. Pipelining is a processor implementation technique typically used in vector processors that increases the flow of instructions executing through the processor by simultaneously overlapping the various stages of execution of multiple instructions that each require more than one clock cycle to complete. The work to be done by each multiple-cycle instruction is broken into small pieces such that, at any given time, many instructions are in different stages of execution in the pipeline. Pipelining techniques are also implemented in methods used to fed instructions to the processor and many present art high-speed computers employ instruction pipelines. An instruction pipeline increases the flow of instructions to the processor by maintaining a full queue of waiting instructions that are ready to be fed, or issued, to the processor at the very next clock cycle that the processor can accept for instruction.

While a processor with multiple functional resources has the potential for significantly increased performance, the existence of multiple functional resources greatly increases the complexity of the execution flow of instructions in a processor. For high performance processors, the complexity of execution flow is further compounded by the use of pipelining techniques, both functional unit pipelines and instruction pipelines. For example, consider the execution flow associated with different arithmetic functions that require different amounts of time to complete, e.g., a divide instruction vs. a multiply instruction. In this situation, the different functional unit pipelines will have different latencies. When a processor has multiple functional units with different latencies, it is possible for instruction B to start executing after instruction A has started to execute and complete while instruction A is still executing. Generally, these latencies do not affect the performance of the functional unit pipeline as long as instructions are not dependent upon one another.

Unfortunately, situations known as hazards may prevent the next instruction in the instruction queue from starting during a particular clock cycle. Instruction dependency is a common hazard of this type. For example, an ADD instruction may need to use the result from a currently executing MULTIPLY instruction as an operand. Thus, the ADD instruction is dependent upon the MULTIPLY instruction and cannot execute until the result from the earlier instruction is available. To handle such hazards, the hardware in the processor uses an instruction pipeline interlock that stalls the instruction pipeline at the current instruction until the hazard no longer exists. In the example given here, the instruction pipeline interlock clears when the result of MULTIPLY instruction is available to the dependent ADD instruction.

One of the ways to optimize the performance of a processor in response to the existence of such hazards is instruction scheduling. Instruction scheduling is a compiler or run-time technique that rearranges the execution order and functional resource allocation of the instructions compiled from a computer program so the instructions execute in the fastest and most efficient order possible. While the rearranged stream of instructions is semantically equivalent to the original stream, the instruction scheduler arranges and overlaps the execution of instructions so as to reduce overall execution time. Instructions are scheduled so as to attempt to minimize any compound effects their dependency and functional unit latency may have on pipeline performance. The existence of multiple functional resources and the parallelism between mutually independent instructions may also allow the scheduler to hide the latency of the one or more of the processor's functional units and thereby sustain pipelined instruction execution.

Presently, instruction scheduling is typically done using dynamic and/or static scheduling techniques. Some processors, like the CDC 6600 and the IBM 360/91, perform dynamic instruction scheduling as a method of functional resource allocation at execution time that uses a technique called scoreboarding. Scoreboarding is a method of allocating register space that ensures instructions are not issued unless their required register resources are available. Advancements in processor architectures of high performance processors, such as the addition of multiple arithmetic and logical functional units, require scheduling techniques beyond the capability of scoreboarding. For these processors, instruction scheduling must deal not only with functional resources such as registers, but also with the functional unit latencies and other time requirements. Consequently, prior art instruction scheduling may also use static instruction scheduling in an attempt to solve these problems.

Static instruction scheduling is a software-based technique that is done at compile time after machine instructions are generated. Typically, the compiler builds in instruction dependence graph based on the dependencies among the instructions in the instruction stream to be scheduled. Using the instruction dependence graph, the scheduler first generates a preliminary ordering of the instructions in the stream. Next, the compiler estimates the functional unit latency (the time needed for the instruction to normally execute) and the amount of time necessary to accomplish the data transfer from memory for each instruction. Based on information from these two estimates, the scheduler generates a final ordering of instructions.

In prior art instruction schedulers, such as one described by Wei-Chung Hsu in "Register Allocation and Code Scheduling for Load/Store Architectures," it is assumed that all pipeline interlocks are resolved at instruction issue time. This assumption is based on a typical model of instruction issue in which both scalar and vector instructions issue sequentially. In practice, the longer execution times of the vector instructions can clog the issue pipeline and halt the issuance of all instructions. In prior art systems, these halts adversely affect the rate of instruction execution. The architecture of the scalar/vector processor that is the subject of the previously identified co-pending application entitled SCALAR/VECTOR PROCESSOR addresses this problem by providing for a vector initiation mechanism that is separate from the instruction issue mechanism to prevent the backlog of vector instructions that are halted because of a hardware interlock.

Although prior art instruction schedulers are adequate for many pipelines processors, one of the inadequacies of present instruction schedulers is scheduling functional resources for pipelined scalar/vector processors with multiple vector functional units. Such processor have at least two functional units that perform the same set of vector arithmetic operations. In a vector processor with multiple functional units, an instruction may execute in any one of several functional units able to perform the required arithmetic operation(s). This circumstance presents new alternatives that an instruction scheduler must analyze and factor into scheduling decisions. As a result, there is a need for an instruction scheduling method that takes into account that set of information which will enable the instruction scheduler to select the optimum instruction execution path from a set of alternative paths. In addition, there is a need to provide an instruction scheduler that is also takes into account the existence of alternative models for instruction issue and initiation in a vector processor having multiple functional units.

SUMMARY OF THE INVENTION

The present invention is a method for scheduling instructions for a processor having multiple functional resources wherein the reordering of the instructions is accomplished in response to a simulation of the run-time environment of the target machine. The simulation of the run-time environment of the target machine is performed at compile time after the machine instructions have been generated by the compiler, or after instruction generation by an assembler. The present invention rearranges the machine instructions for a basic block of instructions into an order that will result in the fastest execution based upon the results of the simulation of the interaction of the multiple functional resources in the target machine.

The method of the present invention operates on a basic block of instructions, and first determines which instructions are members of the Leader Set, in a manner similar to prior art static instruction schedulers. The desired issue time (DIT) is then determined for each instruction in the Leader Set, and those instructions which can benefit from immediate issuance (as determined from the DIT calculation) are moved into the Ready Set. From the Ready Set, instructions are scheduled for issuance in the order of highest cumulative cost.

Leader Set instructions are those instructions that are leading candidates for being scheduled next. An instruction is included in the Leader Set if all the instructions on which it depends have been issued. Because present static instruction schedulers can only estimate the latencies and hardware interlocks among multiple functional resources, the Ready Set in the prior art includes all instructions within the Leader Set that have their dependencies resolved at the time of issue.

Unlike the prior art static instruction schedulers, the present invention determines which instructions will be members of the Ready Set based upon the results of a compile-time simulation. After determining the Leader Set in the usual manner, the present invention then computes a Desired Issue Time (DIT) for each instruction in the Leader Set. The DIT for an instruction is the latest point in time the instruction could issue and still complete execution at the time it would have completed had the instruction been issued immediately. This serves to identify those instructions which can benefit from immediate issuance, and those which could be deferred to a later issue time without a penalty in completion time. Those instructions whose DIT is less than the current value of the simulated time in the compile-time simulation are moved into the Ready Set. This method has the effect of delaying issuance of any instruction that cannot benefit by immediate execution. By pushing an instruction that cannot benefit from immediate issue back in the issuance order, the present invention allows instructions that can benefit from early execution to be moved to the Ready Set, i.e., to "bubble" to the top of the instructions to be scheduled. In addition, unlike prior art schedulers, the present invention excludes from the Ready Set those instructions that would encounter a hardware interlock if issued immediately. An instruction whose DIT is greater than the current value of the simulated time is one which will encounter an interlock if issued immediately, and so the method of the present invention treats the instruction as if it is not ready to be issued.

As compared with prior art static scheduling methods, the simulation of actual latencies and hardware interlocks among multiple resources in a processor by the present invention provides a more accurate method for determining which instructions should be in the Ready Set. The accuracy of the membership in the Ready Set is increased, both in terms of those instructions that should have been included in the Ready Set, but were not because of a too conservative estimate of a latency or interlock, and those instructions that should not have been included in the Ready Set, but were because it was not known that they could be issued at a later time and still complete at the same time they would have if they were issued earlier.

The present invention determines the DIT by first predicting the earliest possible issue time (EPIT) for an instruction (based on scalar interlocks), and then simulating the instruction completion time (based on the EPIT just predicted) and comparing completion times on all combinations of available functional resources. The DIT is the latest simulation time that an instruction can issue and still complete by the earliest completion time. In this sense, the DIT is selected as the optimum instruction execution path among a set of alternative paths.

Having determined the members of the Ready Set, the method of the present invention schedules instructions from the Ready Set in an order determined by the relative costs of the instructions. The "cost" of an instruction represents the cost of not issuing the instruction in terms of how many other instruction depend upon this instruction completing. An instruction upon which many other instructions depend will have a higher cost than an instruction upon which few other instructions depend. Those instructions in the Ready Set with the highest cost are scheduled for execution first. This cost accounting serves to identify and schedule for early execution those instructions critical to execution of the entire basic block.

Although the present invention is applicable to any type of processor having multiple functional resources, the preferred use of the present invention is in connection with a pipelined scalar/vector processor having multiple scalar or vector functional units capable of performing the same arithmetic operations and a vector initiation mechanism that is separate from the instruction issue mechanism. The preferred embodiment of a processor for which the present invention would be used is described in detail in the previously identified co-pending application entitled SCALAR/VECTOR PROCESSOR. In this processor, the vector initiation mechanism is comprised of a secondary vector instruction issue pipeline including a vector instruction queue (5 instructions deep), a vector initiation queue (1 instruction deep), and sets of initiation/dependent initiation control logic by which a waiting vector instruction is either initiated or assigned to execute in a functional unit, or is dependently initiated with vector registers reserved but no immediately available functional unit. In contrast to vector instructions, a scalar instruction in this processor does not issue until all of its operand data is available. Once a scalar instruction issues, it execution (except for memory loads and stores) completes in a fixed number of cycles.

The very highest level of instruction flow and scheduling analysis for the preferred embodiment can be seen as instructions are issued from the instruction issue pipeline. The instruction scheduler can offload number of vector instructions into the series of queues contained in the vector initiation pipeline. The vector initiation extension to the instruction issue provides the scheduler with a "launch window" from which to line up the significant vector instruction resource requirements of registers, memory, and functional units. Heavily vectorized portions of code are thus efficiently stacked within the vector processor, thereby decreasing interlock halts in the instruction issue pipeline and the issue of scalar instructions due to an accumulation of waiting vector instructions.

The next level of instruction flow and scheduling analysis for the preferred embodiment can be seen within the vector initiation pipeline. Vector instructions move through the vector initiation pipeline and its interlocks until the vector instructions are released and start execution in a functional unit. For a machine with a vector initiation queue, scalar pipeline interlocks are resolved at issue time, but vector pipeline interlocks are not resolved until after vector initiation time. The scheduler of the present invention uses simulation timings for vector instruction issue, initiation, start, execution, and completion times, and has estimated memory transfer times in ordering the vector instruction stream. Also, the scheduler accounts for dependencies between vector instructions and for scalar/vector instructions having scalar operand dependencies in the scheduled order. Thus, the instructions offloaded into the vector initiation pipeline are scheduled in the order of optimal execution completion times based on the compile-time simulation.

Because of the presence of multiple functional units capable of performing the same arithmetic or logic function in the preferred scalar/vector processor, the present invention provides a method for generating path directive instructions that indicate to the processor when the standard rules for the vector initiation should be avoided. When a vector instruction is issued and that instruction can execute on more than one functional unit, the instruction is normally initiated on the functional unit that least recently initiated an instruction. However, based upon the compile-time simulation, the scheduler of the present invention can determined when a vector instruction that would initiate by default on one functional unit in actuality would start earlier on a different functional unit. When the scheduler determines that this is the case, a unique instruction called the PATH instruction is inserted just before the vector instruction being scheduled. The PATH instruction specifies the functional unit to which the subsequent instruction is to initiate, and overrides the default choice made by the control logic in the vector initiation pipeline.

The scheduler of the present invention uses many of the kinds of conventional information available to prior art compiler-based instruction schedulers, including estimates for memory transfer times and instruction dependencies. To order the instruction stream, the information considered includes simulation timings for instruction issue, start, execution, and completion times, vector initiation times and the lookahead status of vector functional units. In taking status of the vector functional units, the scheduler looks ahead at the execution stream occurring in all the functional units and, for this look ahead, determines the optimum choice of functional unit for a particular instruction. It is not unusual for this look ahead to include the analysis of 100 to 200 instructions.

Accordingly, it is an object of the present invention to provide a method for optimizing the reordering of the instructions to be executed on a processor having multiple functional resources in response to a simulation of the run-time environment of the target machine.

It is another objective of the present invention to provide an instruction scheduling method that takes into account that set of information which will enable the instruction scheduler to select the optimum instruction execution path from a set of alternative paths among multiple functional units.

It is a further objective of the present invention to provide an instruction scheduler that it takes into account the existence of alternative models for instruction issue and initiation in a vector processor having multiple functional units and is capable of performing effective static instruction scheduling for pipelined processors having an extended vector instruction initiation.

Another object of the present invention is to provide a method for generating path directive instructions that indicate to the processor which arithmetic or logical functional unit should be used to perform a given instruction.

A further objective of the present invention is to increase the rate of instruction flow, and decrease the instruction issue pipeline halts in a scalar/vector processor having multiple functional units.

These and other objectives of the present invention will become apparent with reference to the drawings, the detailed description of the preferred embodiment, and the appended claims.

DETAILED DESCRIPTION OF THE PREFERRED EMBODIMENT

Figure 1A:
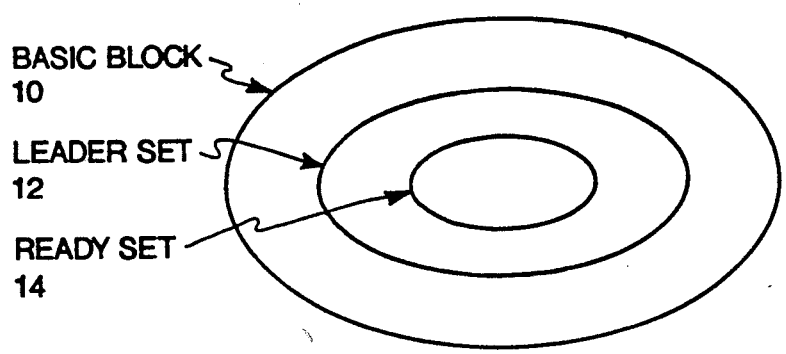
FIG. 1a is a Venn diagram of the Leader Set and Ready Set for a Basic Block as generated by prior art static instruction schedulers.
Figure 1B:
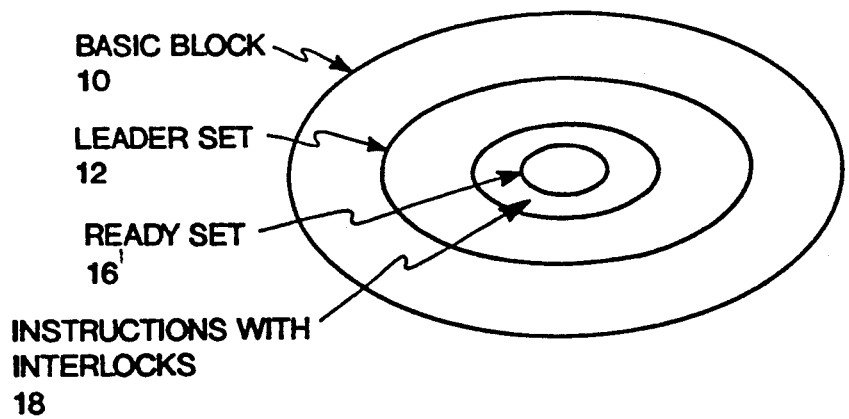
FIG. 1b is an equivalent Venn Diagram to that shown in FIG. 1a of the Leader Set and Ready Set for a Basic Block as generated by the present invention.

Referring now to FIGS. 1a and 1b, an overview of the difference between the present invention the prior art methods of generating the Leader Set and Ready Set for an instruction scheduler will be described. Present compilers manipulate source code programs in the process of creating an executable file by identifying the basic blocks of the program. A basic block 10 is defined is a set of instructions having a single entry and a single exit. The Leader Set 12 is a set of instructions in a basic block that are the leading candidates for scheduling next. It consists of all instructions in a basic block where the instructions upon which the instruction in question depends that have at least issued. Both the prior art instruction schedulers and the present invention create the Leader Set 12 in a similar manner, as described in greater detail in connection with FIGS. 2 and 3. The Ready Set 14, 16 is the set of instructions for a basic block that are determined to be ready to issue at a given point in time. As can be seen, the Ready Set 14, 16 is a subset of the Leader Set 12.

The difference between the prior art and the present invention is in the generation of the Ready Set 14, 16. Although it may not be apparent, a person skilled in the art will appreciate that the objective of any instruction scheduling program is to make the Ready Set 14, 16 as accurate as possible, thereby increasing the probability that instructions in the Ready Set 14, 16 will, in fact, execute to completion without hardware interlock. Because present static instruction schedulers can only estimate the latencies and hardware interlocks among multiple functional resources, the prior art Ready Set 14 includes all instructions that have their dependencies resolved at the time of issue. Unlike the prior art static instruction schedulers, the present invention determines which instructions will be members of the Ready Set 16 based upon the results of a compile-time simulation.

The present invention tests each member of the Leader Set 12 for inclusion in the Ready Set 16 by first computing a Desired Issue Time (DIT) for each instruction in the Leader Set 12. Those instructions whose DIT is less than the current value of the simulated time in the compile-time simulation are included in the Ready Set 16. This method has the effect of delaying issuance of any instruction that cannot benefit from early execution. The instructions that cannot benefit from immediate issuance are those that would encounter an interlock if executed immediately, and are represented by "Instructions with Interlocks" 18 in FIG. 1b. By pushing these instructions back in the issuance order, the present invention allows instructions that can benefit from immediate execution to be moved to the Ready Set, i.e., to "bubble" to the top of the instructions to be scheduled. In other words, the simulation of actual latencies and hardware interlocks among multiple resources in a processor by the present invention provides a more accurate method for determining which instructions should be in the Ready Set. Although for any given basic block, the number of instructions in the Ready Set at any given time may be now different than with the prior art Ready Set, the accuracy of the membership in the Ready Set is increased. Those instructions that should have been included in the Ready Set, but were not because of a too conservative estimate of a latency or interlock, are added to the Ready Set. Those instructions that should not have been included in the Ready Set, but were because it was not known that they could be issued at a later time and still complete at the same time they would have if they were issued earlier, are deleted from the Ready Set. The end result is that the rearrangement of instructions by the scheduler of the present invention will result in a more optimal organization of instructions and, hence, increased performance for the processor.

In determining membership in the Leader Set 12, the instruction scheduler of the present invention first constructs a dependency DAG (directed acyclic graph) for the block of code 10 to be scheduled. Typically, instruction schedulers perform scheduling over a basic block of an intermediate language in which the intermediate language closely approximates the assembler language of the target machine.

In the following discussion, the process of scheduling instructions for execution will be described. The scheduling is performed at compile (or assembly) time, and is done by analyzing a simulation of the run-time environment of the target machine. It is therefore conceptually helpful to think of instructions which have been scheduled as having been "issued" in the simulation sense. Since the method of the present invention concerns code optimization techniques at compile or assembly time, those skilled in the art will recognize that reference to an instruction having been issued actually refers to issuance in the simulation, not a target machine.

Figure 2:
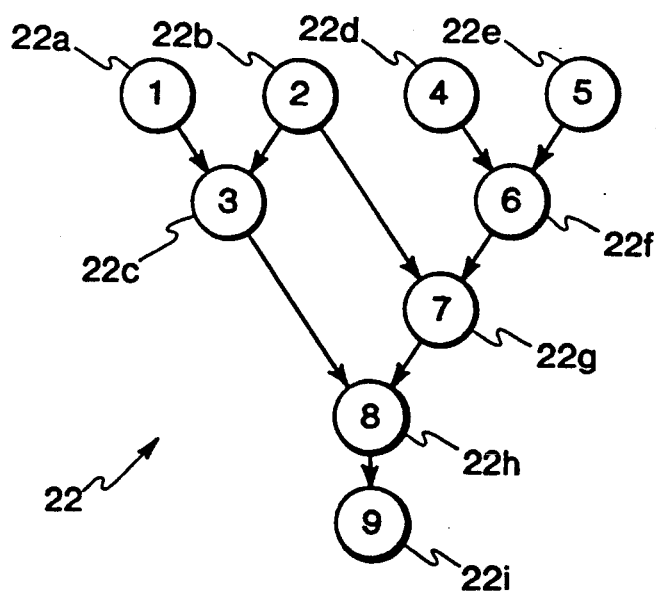
FIG. 2 is an example of a dependency directed acyclic graph used by the instruction scheduler of the present invention.

Referring now to FIG. 2, source code, intermediate language code, and a corresponding dependency DAG are shown. Source equations 20 are shown along with their representation in a series of nine intermediate language statements 21 that approximate assembly level instructions. From the intermediate language instructions 21, the scheduler generates a dependency DAG 22. Each node of the dependency DAG 22 corresponds to one assembly language instruction, as correspondingly numbered in FIG. 2. For example, node 22a of the dependency DAG 22 corresponds to assembly language instruction 21a. The edges between the nodes in the DAG 22 are drawn as arrows and indicate dependencies between instructions. The edge 24 between node 22b and node 22g indicates that instruction 21b must execute before instruction 21g. Nodes with no incoming edges have no dependencies in the basic block, and need not wait for any other instruction before they can be issued.

The nodes in the dependency DAG 22 are then each assigned a cumulative cost value in reverse order. Conceptually, the "cost" of an instruction is the time consequence of not issuing the instruction. In other words, an instruction from which many others depend has a higher cost than an instruction from which few others depend. Arithmetically, the cost of an instruction is calculated as the execution time of the instruction plus the cumulative execution times of all other instructions which depend therefrom. Another way of expressing this is to say that the cost of an instruction is the cost of all the successor nodes within the basic block plus the time of execution of the current node. The relative costs calculated in this way from the dependency DAG 22 identify the critical paths of instructions in the basic block. Taken as a whole, the dependency DAG 22 thus imposes a partial ordering on the instructions in the basic block. The scheduler is free to reorder the instructions based on the dependencies, as long as the partial order is maintained.

The process or reordering instructions according to the present invention, occurs through a simulation of the run-time environment of the target machine. Through use of the DAG, each instruction in the basic block which has not yet been scheduled in placed in the Leader Set if it is not dependent 16 upon any unissued instructions. A leader instruction is identified in a DAG as a node with no predecessors. For example, in DAG 22, nodes 22a, 22b, 22d, and 22e are leader nodes representing intermediate language instructions 21a, 21b, 21d, and 21e. An instruction is not eligible to be issued until it becomes a leader. As instructions are issued, their nodes are removed from the DAG and certain successor nodes become new leaders. Once promoted to the Leader Set, an instruction remains in the Leader Set until it is issued.

Figure 3:
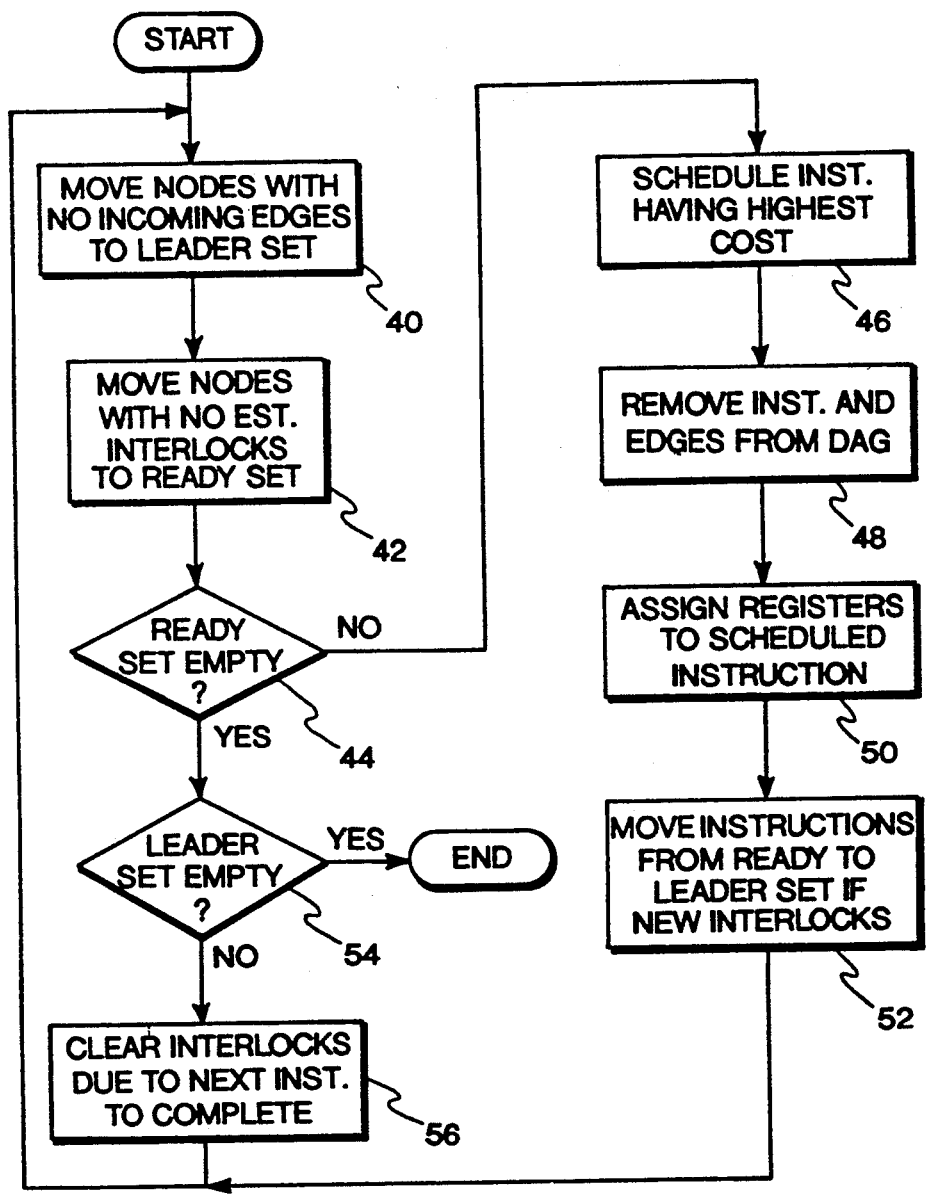
FIG. 3 is a process diagram showing a typical prior art instruction scheduling method.

FIG. 3 shows a prior art instruction scheduling method. Scheduling is done through manipulation of a DAG created for the basic block being scheduled as described above. First, the prior art method identifies the Lead Set at step 40 as the instructions corresponding to nodes in the DAG with no incoming edges. Of the instruction in the Leader Set, those that have no estimated interlocks are moved into the Ready Set at step 4. Interlocks are caused by machine resources such as registers which are needed by an instruction, but are unavailable, typically due to their being used by a still executing previous instruction. Interlocks are statically estimated based upon a predefined instruction completion time. Instructions in the Leader Set without interlocks are ready to execute, and are thus properly placed in the Ready Set, according to prior art methods.

If the Ready Set contains one or more instructions at step 44, the method schedules the instruction in the Ready Set having the highest cost at step 46. The scheduled instruction is then removed from the DAG step 48, the machine resources are assigned to the scheduled instruction at step 50, and any instructions in the Ready Set which now would encounter an interlock are moved from the Ready Set into the Leader Set at step 52. The process then iterates by returning to the beginning to schedule additional instructions.

In the event that the Ready Set is empty at step 44, the process then checks the Leader Set at step 54 to see if ti is also empty. If the Ready Set and the Leader Set are both empty, this indicates that there are not more instructions in the basic block to be scheduled, and the process ends. If the Leader Set is not empty at step 54, then interlocks due to currently executing instructions are clear at step 56 for the instruction which would be the next to complete. This of course requires that the process make estimates of instruction execution times and instruction completion times, so as to estimate when interlocks caused by executing instructions would clear.

At each iteration of the prior art method shown in FIG. 3, the scheduler chooses the instruction with the highest cumulative cost from the set of instructions which have no pending pipeline interlocks. The prior art is effective because it chooses to issue the instruction without interlocks on the most critical path. Once issued, each instruction will execute to completion.

While the above described method is effective in prior art machines, it is less effective when a vector processor has an extended vector issue pipeline, as is the case in the preferred embodiment, or when the machine has multiple functional units, each capable of executing a given function type. In this circumstance, vector instructions may suffer pipeline interlock after issue time since at issue time, a vector instruction has cleared only scalar interlocks, and has been allowed to join the initiation queue. A vector instruction may experience further delays due to vector register access restrictions or functional unit restrictions, or may experience a stall due to an interlock affecting a preceding vector instruction in the initiation queue.

Unlike the prior art scheduling method, scheduling according to the present invention is done through a simulation of the target machine's run-time environment, as well as through manipulation of a DAG created for the basic block being scheduled. The present invention differs rom prior art in the method for moving vector instructions to the ready set and in the method for tracking the scheduler's simulated time. By performing a thorough simulation of the target machine at the system clock cycle level, the instruction execution times can be accurately predicted rather than merely estimated, and execution times using alternate execution paths through alternate functional units can be determined, so as to select the most efficient of the available execution path options. Those skilled in the art will recognize that the details of the simulation depend upon the target machine in question, and are thus beyond the scope of the present specification. In the preferred embodiment, simulation is facilitated through use of an instruction description table, which includes information on each instruction's execution time, the control registers implicitly read or written during execution (such as vector mask), and explicit register (such as for operands or results).

Figure 4:
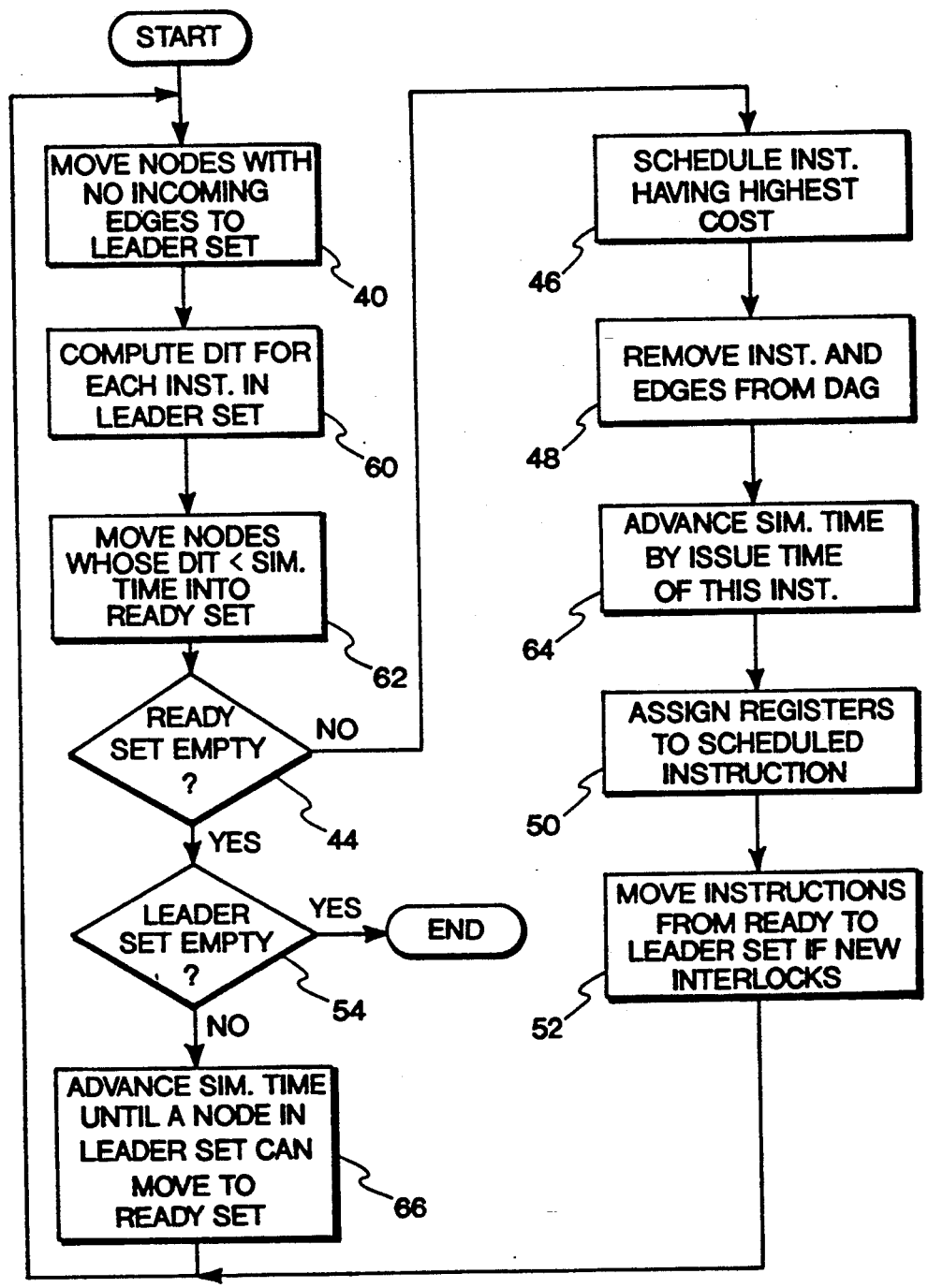
FIG. 4 is a process diagram showing the instruction scheduling method of the present invention.

Referring now to FIG. 4, a method of scheduling instructions according to the preferred embodiment of the present invention is shown. As in the prior art, the process according to the present invention operates on a basic block of code, and begins by moving all instructions into the Leader Set whose corresponding nodes in the DAG have no incoming edges at step 40. The desired issue time (DIT) for each of the Leader instructions is then calculated at step 60. The DIT for an instruction is the latest point in time at which an instruction can be issued, and still complete at the same time it would have completed had it been issued immediately. For example, if an instruction issued at t=0 would complete at t=200, then the DIT for the instruction is the latest point in time for issuing the instruction, while having it complete execution at t=200. Details of DIT calculation are described in reference to FIG. 5.

Having calculated the DIT for all instructions in the Leader Set at step 60, the process then moves into the Ready Set any instruction whose DIT is less than the current simulation time at step 62. If the Ready Set is empty at step 44 and the Lead Set is empty at step 54, all instructions in the basic block have been scheduled and the process ends. If the Ready Set is not empty at step 44, then the instruction in the Ready Set having the highest cost is scheduled at step 46, and its node and outward edges are removed from the DAG at step 48. The simulation time is then advanced at step 64 to the point in time when the simulation determines that the instruction just scheduled would actually issue. The machine resources such as registers and the functional unit are assigned to the scheduled instruction at step 50, and any new interlocks caused by the assignment of machine resources are checked to see if instructions in the Ready Set need to be moved back into the Leader Set at step 52. The process then returns to the beginning, to schedule the next instruction.

In the event that the Ready Set is empty at step 44, and the Leader Set is not empty at step 54, the simulation time is then advanced to the point where an instruction in the Leader Set can be moved into the Ready Set at step 66. The process then returns to the beginning, and continues until all instructions in the basic block have been scheduled.

Those skilled in the art will recognize that many modifications can be made to the method described in FIG. 4, without departing from the scope of the present invention. For example, the order of performing steps 48, 64, and 50 is not critical to proper operation of the method.

Figure 5:
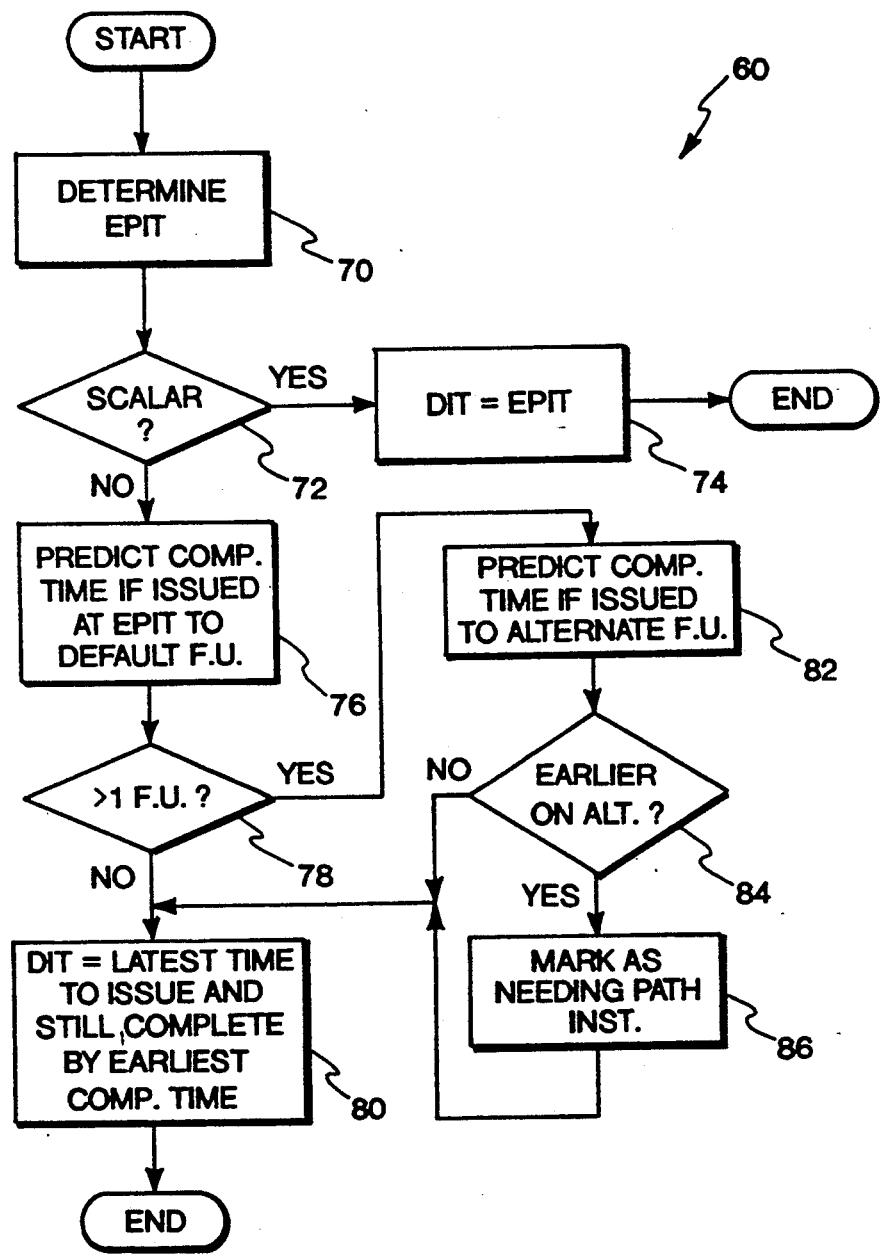
FIG. 5 is a process diagram showing the method for computing the DIT of instructions, and for inserting PATH instructions where appropriate, according to the present invention.

Referring now to FIG. 5, a method of determining the DIT of an instruction 60 is shown. First, the earliest possible issue time (EPIT) for the instruction is determined at step 70. This will occur when scalar interlocks in the machine have cleared for the instruction in question. If the instruction is a scalar instruction at step 72, then the DIT is set equal to the EPIT step 74, and the process ends since if issued at EPIT, the scalar instruction will execute to completion without encountering any interlocks. Delaying issuance of a scalar instruction beyond EPIT will thus delay the completion time of the instruction.

If the instruction in question is a vector instruction (step 72), the simulation predicts the completion time of the instruction at step 76, assuming that the instruction was issued at the EPIT to the default functional unit. In the preferred embodiment of the present invention, the target machine has a vector instruction pipeline, and an instruction initiation procedure, as described in the related application entitled SCALAR/VECTOR PROCESSOR. The significance of the target machine architecture to the method shown in FIG. 5, is only that the simulation of the target run-time environment must be cognizant of the specific machine architecture involved, in order to accurately predict instruction completion times. So in the preferred embodiment, when a vector instruction is moved to the Leader Set, the earliest initiation time of the instruction is calculated based on the EPIT and vector pipeline interlocks that the instruction will encounter in the initiation queue. The DIT is then determined by computing the latest possible issue time of the instruction that will result in initiation at the earliest possible time. The DIT will always be greater than or equal to the EPIT. In the preferred embodiment, an instruction moves from the Leader Set to the Ready Set when the simulated time reaches the DIT.

The process next determines at step 78 whether there is more than one functional unit on which the instruction could execute. If not, then the DIT is set at step 80 to be equal to the latest point in time the instruction could be issued so as to still complete at the predicted completion time. If there is more than one functional unit on which the instruction could complete (step 78), the process predicts the completion time for the instruction step 82, for each of the alternate functional units, again assuming issuance at EPIT. If completion would be earlier on an alternate functional unit (step 84), then the instruction is marked as needing a PATH instruction at step 86, to override the default choice of functional units When the instruction is scheduled, if an alternate path is preferred, a PATH instruction is inserted into the instruction stream. Either way, the process sets DIT at step 80 according to the earliest predicted completion time, as previously determined.

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

What is claimed is:

1. In a computer that compiles or assembles a source code program to produce object code instructions, an improved method of scheduling instructions in a basic instruction block for execution, the method comprising the steps of:

identifying a leader set of instructions as being those instructions without resource dependencies from other instructions within the basic instruction block;

identifying a read set as those instructions in the leader set that would execute without interlock interruption if issued immediately based upon a simulation of the execution of those instructions in the leader set for all combinations of the available functional units in the target computer; and issuing the instruction in the ready set with the highest cumulative pendency cost, wherein the cumulative pendency cost represents the cost of not issuing the instruction in terms of how many other instruction depend upon this instruction issuing.

2. In a computer that compiles or assembles a source code program to produces object code instructions, an improved method of scheduling instructions in a basic instruction block for execution, the method comprising the steps of:

identifying a leader set of instructions as being those instructions without resource dependencies from other instructions within the basic instruction block;

simulating a completion time for each instruction in the basic block, wherein the completion time for each instruction is based upon immediate issue of the instruction;

determining a desired issue time for each instruction in the leader set, wherein the desired issue time is the latest point in time at which the instruction can be issued and still complete by the completion time;

identifying a ready set of instructions as being those instructions in the leader set whose desired issue time is immediately or earlier; and issuing the instruction in the ready set with the highest cumulative pendency cost, wherein the cumulative pendency cost represents the cost of not issuing the instruction in terms of how many other instruction depend upon this instruction issuing.

3. In a computer that compiles or assembles a source code program to produces object code instructions, as part of a method for scheduling a ready set of instructions comprising the steps of:

identifying a leader set of instructions as being those instructions without resource dependencies from other instructions within the basic instruction block;

predicting instruction completion time for each instruction in the leader set based upon a simulation of the execution of each instruction in the leader set for all combinations of the available functional units in the target computer;

determining a desired issue time for each instruction in the leader set, wherein the desired issue time is the latest point in time at which the instruction can be issued and still complete by the predicted completion time; and identifying a ready set of instructions as being those instructions in the leader set whose desired issue time is immediately or earlier.

* * * * *